United States Patent

Breuer et al.

[11] Patent Number: 5,195,239
[45] Date of Patent: Mar. 23, 1993

[54] METHOD FOR ASSEMBLING SHAFTS

[75] Inventors: Hans-Jürgen Breuer; Rolf Brück, both of Overath, Fed. Rep. of Germany

[73] Assignee: Mannesmann Aktiengesellschaft, Dusseldorf, Fed. Rep. of Germany

[21] Appl. No.: 593,675

[22] Filed: Oct. 5, 1990

[30] Foreign Application Priority Data

Oct. 7, 1989 [DE] Fed. Rep. of Germany ....... 3933565

[51] Int. Cl.⁵ .............................................. B21D 53/00
[52] U.S. Cl. ..................... 29/888.1; 29/468; 29/719; 29/810
[58] Field of Search ...................... 29/888.1, 810, 407, 29/464, 468, 719, 721, DIG. 100, DIG. 105; 269/8

[56] References Cited

U.S. PATENT DOCUMENTS

| 4,827,585 | 5/1989 | Nakamura | 29/888.1 |
| 4,863,149 | 9/1989 | Luther et al. | 269/8 |
| 4,875,270 | 10/1989 | Krips et al. | 29/888.1 X |
| 4,881,680 | 11/1989 | Toelke et al. | 29/888.1 X |
| 4,884,329 | 12/1989 | Higuchi | 29/719 X |

Primary Examiner—Joseph M. Gorski
Assistant Examiner—S. Thomas Hughes
Attorney, Agent, or Firm—Anderson Kill Olick & Oshinsky

[57] ABSTRACT

A method for assembling an assembled shaft from a tubular or bar-shaped base member (R) and individual slid-on elements (N), especially a camshaft, with the elements being for example cams, gears or bearing bushes. In the method, the elements (N) are slid on to the base member (R) and are held in the required angular position to be fixed on the base member by magnetic forces. An apparatus for carrying out this method comprises a guiding device (13) for guiding the elements into their axial positions and magnetic holding means (5) operable to hold the elements in the required angular position.

2 Claims, 2 Drawing Sheets

METHOD FOR ASSEMBLING SHAFTS

BACKGROUND TO THE INVENTION

1. Field of the Invention

The invention relates to a method and apparatus for assembling a shaft which comprises a tubular bar-shaped base member and individual ring-like elements received on the base member. The term "ring-like element" is used herein to denote an element which has a hole therethrough which allows the element to be slid on to the base member for fixing to the exterior surface of the base member. Such a shaft may be a camshaft but the elements may be, for example, gears or bearing bushes.

2. Description of Prior Art

From West German Patent Application 38 12 353 A1, there is known a method in which cams are lined up at identical angles on one end of a tubular member, are gripped individually or in pairs by mechanical means, and are moved along the tubular member into the axial position required for fixing purposes, i.e. soldering or welding. The angular position required relative to the tubular member is achieved in that, for fixing purposes, the latter is turned into the required position relative to the axially moved cam so that the required angular position is achieved. Gripping and fixing elements in pairs is possible only if, especially in the case of camshafts for engines having more than two valves per cylinder, adjoining cams are in the same angular position. The method and apparatus provided for such purposes are not suitable for producing those camshafts in which all elements slid on to the base member are to be secured in one single operation. In particular, this applies to producing assembled camshafts by hydraulically expanding a tubular member in sections relative to the slid-on cams.

SUMMARY OF THE INVENTION

It is the object of the present invention to provide a method and suitable apparatus by which, especially for simultaneous securing purposes, all elements of a shaft are held in different angular positions relative to each other by simple and easily modifiable means.

The invention provides a method of assembling a shaft which comprises a tubular or bar-shaped base member and individual ring-like elements on the base member, wherein the elements are slid on to the base member and are held by magnetic forces in the required angular position to be fixed on the base member.

In addition to eliminating complicated mechanical assemblies, this method makes it possible to position simultaneously and independently all slid-on elements. According to a preferred embodiment the elements are also held by magnetic forces in the required axial position to be fixed on the base member. In particular, this applies to precision adjustment of the axial position. Preferably, the elements are moved by mechanical means from pre-positions in which the elements coincide with one another angularly into a position which angularly approximates to the required angular position. It is also preferred that the elements are moved by mechanical means at least approximately into their required axial positions from pre-positions in which the elements are axially arranged directly adjacent one another on or in alignment with the base member. The elements may be supplied from an assembly mandrel axially positioned in front of the base member. Gripping and releasing of the individual elements in their respective required axial positions may be effected pneumatically or mechanically, or magnetically.

The axial guiding system involving mechanical means may simultaneously comprise means for setting the angular position, but according to a preferred embodiment of the method, the setting of the angular position from a standard basic position is achieved exclusively by magnetic forces.

The method is particularly advantageous if all elements are gripped jointly from adjoining, angularly coinciding pre-positions and released individually one after the other into their required positions, with the gripping means moving axially and each time assuming a changed angular position and with holding and precision adjustment being effected by magnetic forces.

The said method is primarily intended for cams which, because of their asymmetric shape, demonstrate a magnetic behaviour which is suitable for setting angular positions by magnetic forces. In the case of completely rotationally-symmetrical parts, such as bearing bushes, angular positioning is, of course, of no significance so that only the axial positioning means mentioned in this context are used. In the case of parts such as gears which are substantially rotation-symmetrical regarding their electro-magnetic behaviour, whose accurate angular positioning is important and which if used for a central output are positioned between individual cams, the method may be applied in that electro-magnetic asymmetric assembly aids may be used, for example clamped on to the elements.

The invention also provides an apparatus for assembling a shaft from a tubular or bar-shaped base member and individual ring-like elements slidingly received thereon, the apparatus comprising a guiding device operable to guide the elements into their axial positions on the base member, and magnetic holding means operable to hold the individual elements in the required angular position to be fixed on the base member.

The magnetic holding means preferably comprises a plurality of magnetic devices each operable to hold one element. An assembly mandrel which acts as an extension of the base member, which has the same diameter as the base member and at the same time serves as a clamping device for it, in a problem-free way, axially guides the elements out of their pre-prepared position where they are arranged at identical angles.

If, for reaching their final positions, the elements merely need to be rotated out of their pre-positions at angles of substantially less than 180°, it is sufficient to provide one single adjusting magnet in a holding device for ensuring the final angular position of the respective element. Each adjusting magnet should preferably be associated with a holding magnet which is positioned so as to be opposed to it by 180° and which is to hold the element relative to the base member in a quasi-floating condition in order to avoid any friction forces. If each holding device is provided with three or more circumferentially distributed positioning magnets, the switching sequence may be changed in terms of time and the elements have to be rotated by 180° by magnetic means.

In an alternative embodiment it is proposed that the magnetic holding devices of the individual elements should be turnable relative to one another around a common axis. On the one hand, this serves to set and adjust the individual holding devices for a specific product. However, if rotation is controlled externally, this embodiment may serve to ensure a regularly recurring rotation of each element from a pre-position into the final position.

Equally, in a preferred embodiment, the magnetic holding devices may be movable axially relative to one another, and again, this design may serve to set and adjust the holding device for a specific product. If this kind of adjusting facility is automated, the said design may also serve to ensure axial precision adjustment. Furthermore, if necessary, the entire process of axially guiding the elements out of their pre-position may be effected by such means.

As indicated above, electro-magnetic precision adjustment may be achieved by designing circumferentially distributed magnets or several magnets positioned axially one behind the other in each holding device in such a way that they may be electrically controlled independently of each other.

Instead of directly changing the magnetic field strength by the voltage applied, a radial mechanical adjustment relative to the element may have the same effect.

In a preferred embodiment, the axial guiding device is designed in such a way that a gripping assembly which may be axially guided through the holding devices comprises clamping means which may grip the elements simultaneously, especially in their narrowest region, and which may be released independently of each other in different axial positions. In a further advantageous embodiment, the gripping assembly is controlled so as to be axially movable and rotatable.

BRIEF DESCRIPTION OF DRAWINGS

A preferred embodiment of the apparatus in accordance with the invention is illustrated in the drawings.

In the drawings.

DESCRIPTION OF PREFERRED EMBODIMENTS

Figure 1:
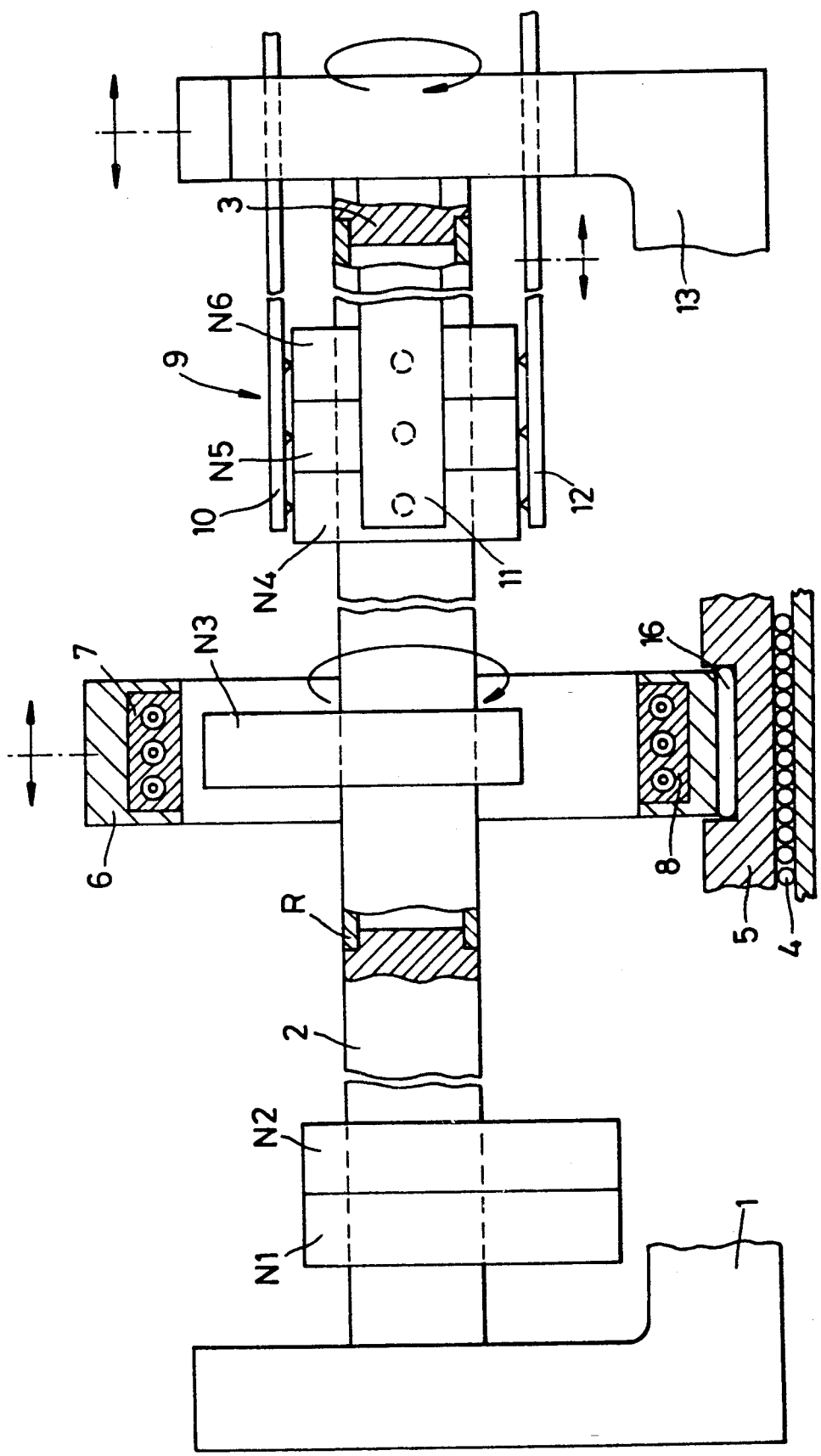
FIG. 1 is a longitudinal cross-section of an apparatus in accordance with the invention.

FIG. 1 shows an apparatus for assembling a shaft from a tubular base member R and individual ring-like elements N1 to N7 slidingly received on the base member R. The apparatus comprises a holding device 1 for the base member R. The holding device comprises two holding mandrels 2, 3 one of which is axially movable to allow the member R to be clamped thereon.

In the operation of the apparatus, elements N1 to N7 are assembled on the mandrel 2 and 3 in pre-positions in which the elements coincide with one another angularly and the elements are axially arranged directly adjacent one another in alignment with the base member R.

The apparatus comprises a guiding device 13 operable to guide the elements N1 to N7 into their axial positions on the base member R. The guiding device 13 comprises gripping means 9 which provides mechanical means by which the elements N1 to N7 are gripped as they are moved on to the base member R by movement of the device 13. The elements are moved from their pre-positions into positions which angularly approximate to their required angular positions and into at least approximately their required axial positions. The gripping means 9 comprises three axially-extending holding jaws 10, 11 and 12 in which individually loaded clamping members are provided to grip the elements N1 to N7.

Figure 2:
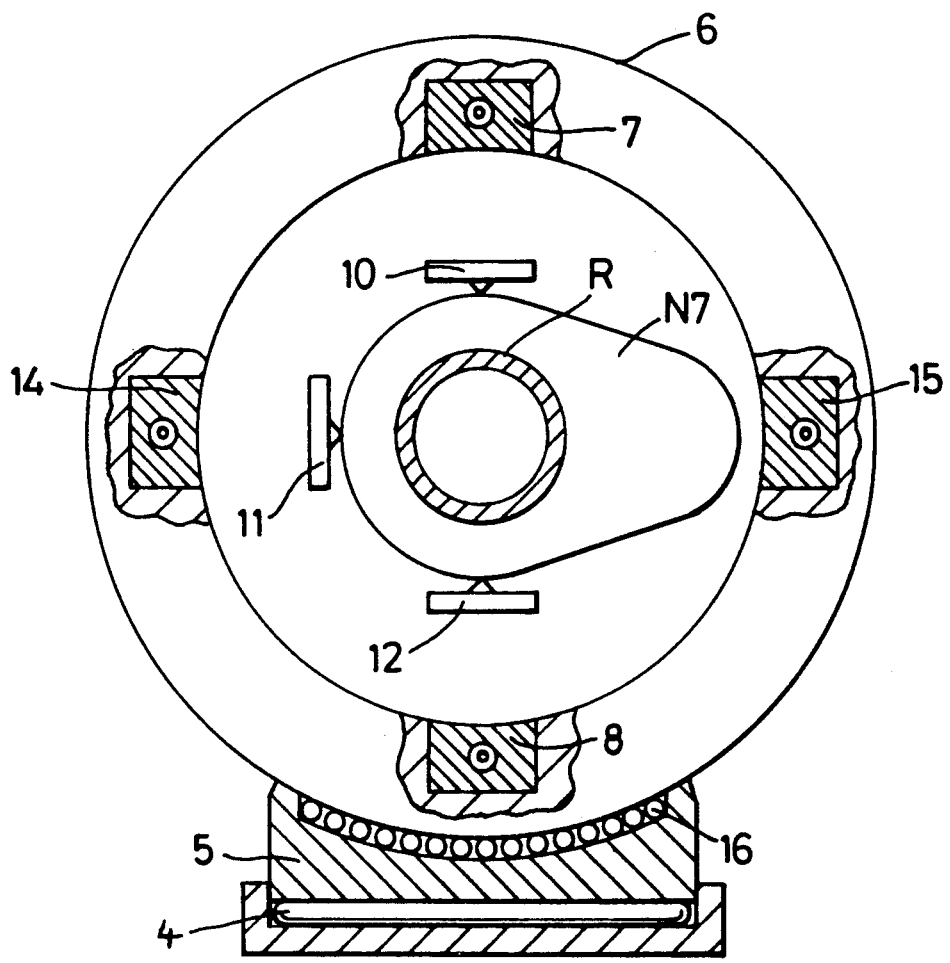
FIG. 2 is a transverse cross-section of the apparatus shown in FIG. 1.

As shown in FIG. 2, the elements N1 to N7 are in the form of cams having a single lobe projecting thereon. The lobe causes the elements N1 to N7 to adopt their angular pre-position due to gravity and the jaws 10, 11 and 12 are arranged to jointly grip a number of the elements N1 to N7 at 90 degree angles omitting the side occupied by the lobe. In FIG. 1, the elements N1 and N2 are shown on the mandrel 2, the elements N4 to N6 are shown on the base member R gripped by the jaws 10, 11 and 12, and the element N3 is shown on the base member R in its required axial and angular position for fixing.

The jaws 10, 11 and 12 are mounted on the guiding device 13 which is movable axially relative to the base member R to carry the elements N1 to N7 at least approximately into their required axial positions and is rotatable about the axis of the member R to turn all the elements gripped thereby into at least the approximate required angular position of an element next to be released.

The apparatus also comprises a plurality of holding devices 5 (only one shown in the drawings) which is mounted on rollers 4 for movement axially of the member R. An annular member 6 is mounted on each holding device 5 on rollers 16 so that it is rotatable about the longitudinal axis of the base member R which passes through the annular member 6. Four magnet assemblies 7, 8, 14 and 15 are mounted on each annular member 6 circumferentially distributed relative to the axis of the base member R. The annular members 6, thus, constitute magnetic devices, each of which is operable to hold one of the elements N1 to N7, which are turnable relative to one another about a common axis and are movable axially relative to one another.

Each magnetic assembly 7, 8, 14 and 15 comprises three electromagnetic coils arranged one behind the other in an axial direction. In an alternative apparatus, however, permanent magnets could be used. The assemblies 7, 8, 14 and 15 are controllable independently of one another as are the three coils of each assembly. The assemblies 7, 8, 14 and 15 can be adjusted radially relative to the axis of the member R and the coils of the assemblies can be moved axially relative to one another.

The longitudinal axis of the member R extends horizontally and in all positions of the magnetic devices 6 each device comprises at least one magnet positioned above this axis, thereby enabling gravity to be overcome. The axis could be arranged vertically in which case at least two circumferentially distributed magnets would be required. In the case of a vertical axis, a mechanical supporting assembly could be associated with each holding device to support an element N1 to N7 without restricting angular movement of the element relative to the axis.

FIG. 2 shows an element N7 gripped by the jaws 10, 11 and 12 which have been moved axially to bring the element N7 to at least approximately the required axial position and have also been rotated to bring the element N7 to at least approximately the required angular position. The element N7 is then within an annular member 6 and the magnetic assemblies thereof can be operated to adjust the angular position (either before or after the jaws 10, 11 and 12 release the element N7) and the magnetic assemblies can also be operated to adjust the axial position (after release by the jaws 10, 11 and 12). Once the axial and angular positions have been adjusted, the assemblies 7, 8, 14 and 15 are operated to hold it in position until it is fixed. If desired, the axial and/or angular position of the elements N1 to N7 can be measured, before fixing, preferably in a non-contact way, e.g. optically, and the magnetic field distribution caused by the assemblies 7, 8, 14 and 15 can be adjusted by processor-control to adjust any positional errors detected.

The apparatus is used in a method of assembling a shaft according to the invention. In this method, the elements N1 to N7 are assembled in pre-positions on the mandrels 2 and 3. In the pre-positions the elements coincide with one another angularly due to the action of gravity. The jaws 10, 11 and 12, then, grip a number of elements and the device 13 is moved so that the elements are slid on to the base member. When the foremost element (N4 in FIG. 1) reaches its approximate axial position the axial movement of the device 13 stops. The element is now within an annular member 6 which has been pre-positioned axially and angularly. The device 13 is now rotated to bring the elements all to the approximate required angular position of the foremost element. This rotation may alternatively take place at least partially during the axial movement of the device 13. The jaws 10, 11 and 12 now release the foremost element and the device 13 withdraws therefrom moving axially and, if necessary, angularly to approximately position the next element to be released. The released element is now precisely positioned axially and angularly by operation of the magnet assemblies 7, 8, 14 and 15 and is held in position angularly and axially by magnetic forces to be fixed on the base member by welding or soldering.

We claim:

1. A method of assembling a plurality of similar asymmetrical ring-like elements in predetermined axial and angular positions on a tubular or bar-shaped base member comprising the steps of:
   (a) providing an elongated tubular or bar-shaped base member;
   (b) holding said base member;
   (c) providing a plurality of asymmetrical ring-like elements;
   (d) holding said ring-like elements in alignment with each other and in alignment with said base member;
   (e) gripping a number of said aligned elements in a row;
   (f) sliding the row of elements onto the base member and positioning a gripped element at an end of the row on said base member in axial and angular positions which at least approximate to said predetermined positions;
   (g) releasing said element at said end of the row;
   (h) supporting the released element by magnetic forces;
   (i) finally positioning said released element at least in its angular predetermined position while supported by said magnetic forces by varying the effect of said magnetic forces on said element; and
   (j) repeating step (f) to (i) inclusive until all of said ring-like elements in said row are positioned in said predetermined positions on the base member.

2. A method according to claim 1, wherein all the elements in said row are turned into an angular position to be taken up by said one element before said one element is released.

* * * * *